United States Patent
Samadani et al.

(10) Patent No.: US 9,179,078 B2
(45) Date of Patent: Nov. 3, 2015

(54) COMBINING MULTIPLE VIDEO STREAMS

(75) Inventors: Ramin Samadani, Palo Alto, CA (US); Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 13/878,224

(22) PCT Filed: Oct. 8, 2010

(86) PCT No.: PCT/US2010/052001
§ 371 (c)(1),
(2), (4) Date: Apr. 7, 2013

(87) PCT Pub. No.: WO2012/047229
PCT Pub. Date: Apr. 12, 2012

(65) Prior Publication Data
US 2013/0188094 A1    Jul. 25, 2013

(51) Int. Cl.
G09G 5/02 (2006.01)
H04N 5/272 (2006.01)
G06T 7/40 (2006.01)

(52) U.S. Cl.
CPC ............... *H04N 5/272* (2013.01); *G06T 7/401* (2013.01); *G06T 2207/10016* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 7,468,742 B2 | 12/2008 | Ahn et al. | |
| 7,477,282 B2 | 1/2009 | Firestone et al. | |
| 2007/0195107 A1 | 8/2007 | DuBois et al. | |
| 2008/0136898 A1 | 6/2008 | Eisenberg et al. | |
| 2009/0183080 A1* | 7/2009 | Thakkar et al. | 715/733 |
| 2009/0271821 A1 | 10/2009 | Zalewski | |
| 2009/0327896 A1 | 12/2009 | Pall et al. | |
| 2010/0066762 A1 | 3/2010 | Yeh et al. | |
| 2011/0052029 A1* | 3/2011 | Connah et al. | 382/131 |

FOREIGN PATENT DOCUMENTS

WO    2006/003040 A1    1/2006

OTHER PUBLICATIONS

A. Yoshino et al., "Stepping-in presentation," Procs. of Int'l Workshop on Multimedia Technologies in E-Learning and Collaboration (WOMTEC), year 2003.
Z. Zhu et al., "Virtualized classroom—automated production, media integration and user-customized presentation," Procs. of 2004 IEEE Computer Society Conf. on Computer Vision and Pattern Recognition Workshops (CVPRW04), year 2004.
International search report and written opinion in priority PCT patent application, PCT/US2010/052001, dated Jun. 27, 2011.

* cited by examiner

*Primary Examiner* — Phi Hoang
*Assistant Examiner* — Mohammad H Akhavannik
(74) *Attorney, Agent, or Firm* — Hewlett-Packard Patent Department

(57) ABSTRACT

Methods, computer-readable media, and systems are provided for combining multiple video streams. One method for combining the multiple video streams includes extracting a sequence of media frames (224-1/224-2) from presenter (222-1) video and from shared digital rich media (222-2) video (340). The media frame (224-1/224-2) content is analyzed (226) to determine a set of space and time varying alpha values (228/342). A compositing operation (230) is performed to produce the combined video frames (232) based on the content analysis (226/344).

14 Claims, 3 Drawing Sheets

COMBINING MULTIPLE VIDEO STREAMS

BACKGROUND

In classic presentations in large venues for large audiences, presentation systems are used to display images and information to the audience while a presenter explains the presentation content while giving the presentation. When these presentations are given, the slide display often needs to be very large and placed high enough so that the display is clearly visible from all corners of the room. This makes it impossible for a presenter to walk up to the display and interact with the display with gestures or gaze. It is also hard for the audience to know which part of the slide the presenter is looking at when he or she has to look the opposite way from the audience while interacting with the presented material.

Modern presentation tools allow for more interactive presentations and supplementation of presentations with video or audio that can be attached to the presentation. Various presentation tools allow for the combination of the presenter's image and the slide display. In some instances, camera-captured video of the presenter, together with the digital rich media video (slide presentations, videos, three-dimensional graphical objects, etc.) are combined to create a presentation. The use of alpha blending has also been used to blend the presenter video with the digital rich media video. However, mere combination of the presenter and digital rich media video often results in low contrast, hard to read slides or hard to see presenters of slides due to visual masking. The use of alpha blending alone may not produce the highest quality videos when the digital rich media is cluttered, the presenter's clothing or background is cluttered, or if there are different brightnesses in the two videos. The resulting presentation contains video of the digital rich media and video of the presenter interacting in undesired ways.

DETAILED DESCRIPTION

Figure 1:
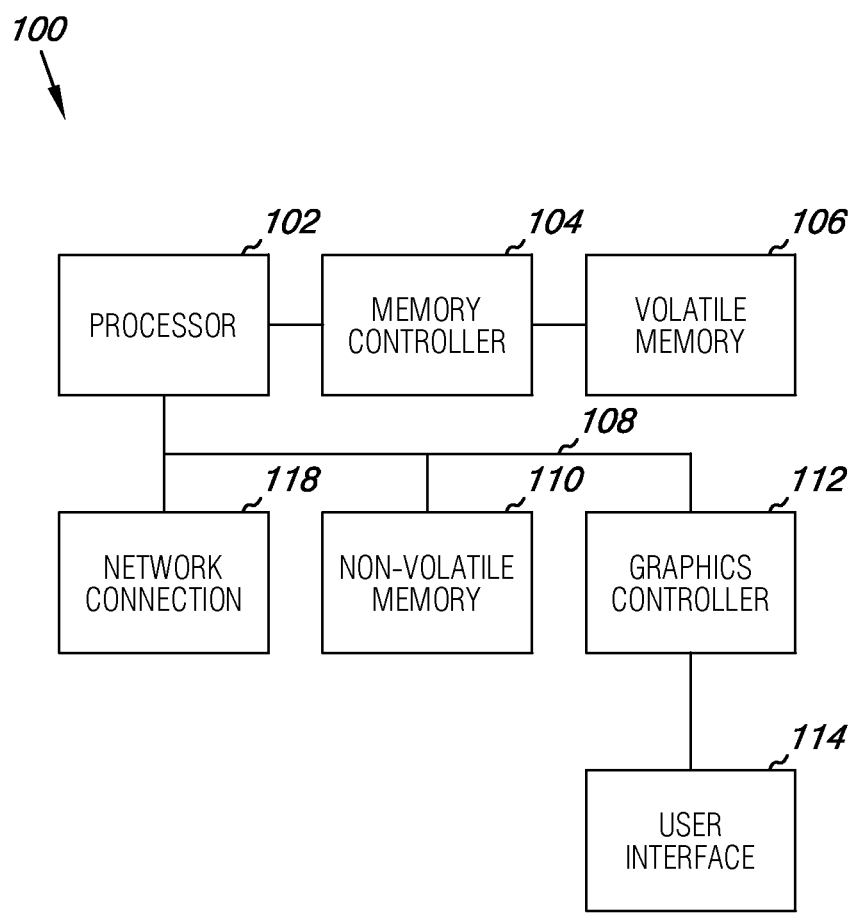
FIG. 1 is a diagram illustrating a computing system suitable to implement one or more embodiments of the present disclosure.

Systems and methods are provided for combining multiple video streams. In an embodiment, multiple video streams are combined by extracting a sequence of media frames from presenter video and from shared digital rich media video. In an embodiment, the presenter and digital rich media frames are analyzed for their content and a set of space and time varying alpha values are determined based on the content analysis. In an embodiment, a compositing operation is performed to produce combined video frames based on the content analysis. The following description of the present disclosure is not intended to limit the scope of the disclosure, but is representative of one or more embodiments of the disclosure.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

According to one or more embodiment, high quality video may be produced by combining camera-captured video of a presenter, together with digital video (without camera-capture) of digital rich media video (slide presentations, videos, three dimensional graphical objects, etc.). By using image analysis and computer vision, two sources of video (i.e. the presenter video and the digital rich media video) can be combined to provide for improved visual appearance in the combined in comparison to combinations not using image analysis and computer vision. The resulting video has high contrast and reduced visual masking effects.

One method for combining multiple video streams includes extracting a sequence of media frames from a presenter video and from shared media video. The presenter video includes camera-captured video of a presenter making a presentation, and the shared media video includes digital rich media video not captured by a camera, such as including, but not limited to, slide presentations, videos, and 3D graphical objects.

It can be difficult to combine multiple video streams without the resulting video having low contrast, hard to read digital rich media video, or hard to see presenters or digital rich media video due to visual masking. The video of the digital rich media and the video of the presenter may interact in undesired ways. One previous method for combining multiple video streams is to overlay a slide with the presenter's image from a video camera, where the presenter's image is cut from his current background and overlaid onto the slide. The resulting video may result in low contrast and low quality video. Therefore, an ability to combine multiple video streams without low contrast, hard to read media, or hard to see presenters or media is desirable.

FIG. 1 illustrates a block diagram of an example of a system 100 for combining multiple video streams according to the present disclosure. The system 100 can include processor resources 102 and memory resources (e.g., volatile memory 106 and/or non-volatile memory 110) for executing instructions stored in a non-transitory computer-readable medium. Actions described herein can be performed by computer executable instructions stored in the memory resources and executed by the processor resources. In addition, actions can be implemented using hardware, including an application specific integrated circuit (ASIC).

The processor resources 102 can control the overall operation of the system 100. The processor resources 102 can be connected to a memory controller 104, which can read and/or write data from and/or to volatile memory 106 (e.g., RAM, Flash) and/or non-volatile memory 110 (e.g., hard disk, SSD, etc.).

The processor resources 102 can be connected to a bus 108 to provide for communication between the processor resources 102 and other portions of the system 100. The non-volatile memory 110 can provide persistent data storage for the system 100. The graphics controller 112 can connect to a user interface 114, which can provide an image to a user based on activities performed by the system 100.

Figure 2:
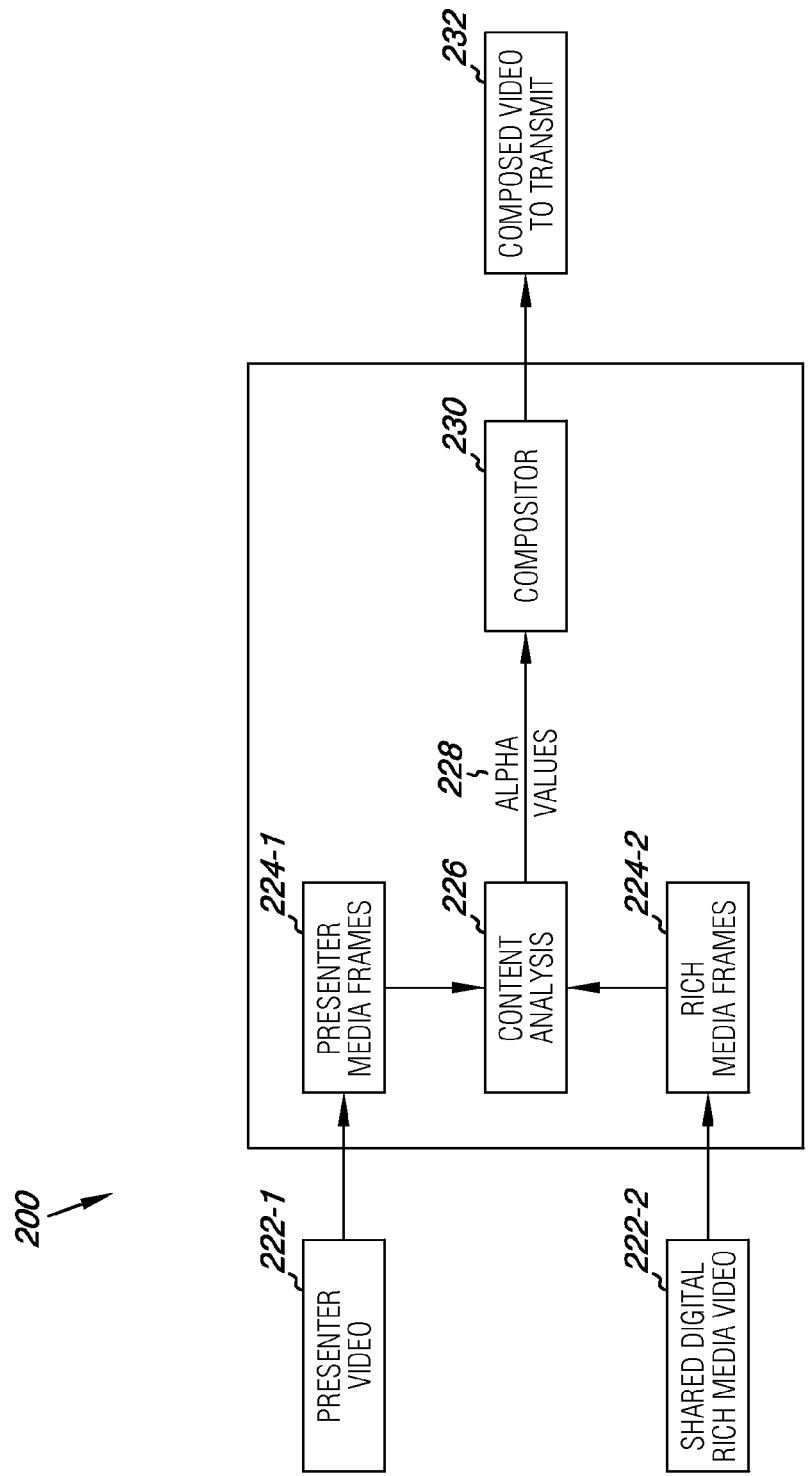
FIG. 2 is a block diagram illustrating a system of combining multiple video streams according to one or more embodiments of the present disclosure.

FIG. 2 illustrates a method 200 of combining multiple video streams according to one or more embodiments of the present disclosure. A sequence of media frames is extracted from a presenter video 222-1 and shared digital rich media video 222-2. Each sequence of presenter media frames 224-1 and digital rich media frames 224-2 is analyzed for its content using a content analysis module 226 and a set of per pixel space and time varying alpha values 228 is determined based on the analysis. The presenter and digital rich media frames are then sent into the compositor module 230 where they undergo a compositing operation to combine the presenter and digital rich media frames, and the result is a composed video to transmit 232. The content analysis module 226 and the compositor module 230 can include computer executable instructions stored in memory resources and executed by processor resources, and/or logic in the form of hardware to perform the described actions.

According to one or more embodiments of the present disclosure, camera video of a presenter is captured and a sequence of presenter media frames is extracted. Digital rich media video is also obtained, but it can be obtained digitally, without camera-capture. By digitally transferring the digital rich media video, the quality of the video is improved by avoiding quality degradation by camera-capture of the shared digital rich media video. A sequence of these digital rich media video frames is also extracted.

In an embodiment, the presenter and digital rich media frames undergo content analysis using the content analysis module 226. Content analysis includes generating a quantity for each of the presenter and shared digital rich media videos that relates to the spatial content at each position in the image frames. One example of this may be computing, in a local image window, a measure of clutter. As used herein, "clutter" is intended to include some measure of image texture that may, for example, make it difficult to discern either the presenter or the shared digital rich media. One method for determining clutter may be to compute the variance in a local window as the measure of clutter. Computing the mean may be used as a measure of brightness. Objects that are too bright may also make it difficult to discern either the presenter or the shared digital rich media. It may be beneficial in content analysis for the variance to be measured in an adequately-sized window so face regions or facial features, for example, are deemed active, but large uniform background regions are not. According to one or more embodiments, other content analysis techniques, including, but not limited to, computer vision and image analysis techniques may provide a variety of different effects. Content analysis may also be based on local contrast determining steps and local brightness analysis.

Digital rich media frames that include text undergo content analysis. Text region detection is performed on the digital rich media video. Logic and software associated with imaging, copy machines, optical character recognition scanners, or other techniques may be used to perform the text region detection. Presenter media frames also undergo content analysis, and face detection techniques are performed to analyze the content of the presenter media frames.

A set of space and time varying alpha values is determined from the content analysis using the content analysis module 226. These alpha values will be used to composite together the presenter video and the digital rich media video. These alpha values can range from 0 to 1 and represent the associated matte for each element. This matte information, or the extent of coverage of an element at a pixel, is retained on an alpha channel. An alpha channel controls the linear interpolation of foreground and background colors. An alpha channel is a mixing factor at every pixel that is used in order to blend elements together from multiple video sources. An alpha value of 0 indicates no coverage (i.e. transparent) and an alpha value of 1 indicates full coverage (i.e. opaque). Fractional alpha values correspond to partial coverage. In what follows, the alpha value represents the space and time varying weights of the digital rich media.

In an embodiment, regions of the presenter video with low variance but high brightness are assigned an increased alpha value (i.e. closer to 1, recall alpha represents the weight of the digital rich media video) because the presenter video background is not informative, and adding large uniform brightness would lower the contrast of the overall scene. If content analysis of a region shows the region is text only, an alpha value of 1 or near 1 is assigned, so the text appears clear. If content analysis determines a region contains a face or facial features only, an alpha value of 0 or near 0 is assigned, so the face appears clear. If after content analysis, it is determined a region is both face and text, an intermediate alpha value, between 0 and 1, is assigned, so both appear in the final blended result. In an embodiment, the alpha values are designed to change gradually in space so there are not harsh transitions in the final blended result.

In an embodiment, the alpha values are tailored to preserve the contrast of the presentation information, by analyzing the shared media colors for slide presentations and preserving the lighter colors by setting $\alpha=\max(R,G,B)$ where $\alpha$ represents the space varying weights of the shared digital rich media. Content analysis techniques, including, but not limited to, computer vision and image analysis techniques, may provide a variety of different effects.

A compositing operation is conducted to produce the combined video frames. Alpha blending is used to composite the video frames in an RGBA representation where A represents an alpha channel with space and time varying alpha values $\alpha(x, y, t)$ with x and y spatial pixel coordinates, and time t. It will be appreciated that alpha blending is just one way to composite the video frames, and other Porter-Duff image compositing operations may also be used.

As will be appreciated, alpha blending is the process of combining a translucent foreground color with a background color, thereby producing a new blended color. If the foreground color is completely transparent, (alpha value of 0) the blended color will be the background color. Conversely, if the foreground color is completely opaque, (alpha value of 1) the blended color will be the foreground color. A translucency between these extremes results in the blended color computed as a weighted average of the foreground and background colors.

This adaptive alpha blending results in enhanced text legibility due to improved contrast and reduced masking clutter. In an embodiment, a method of combining multiple video streams results in improved presenter visibility by using, for example, face detection to enhance the way important facial features such as eyes and lips are blended. In an embodiment, the influence of the digital rich media in these important face feature areas is reduced resulting in improved presenter visibility.

In an embodiment, slide transitions are detected, and dissolves that start by fully presenting the slides and fading into an adaptive alpha blend may highlight the information in the slides at each transition, focusing the viewer's attention. In an embodiment, audio and video activity detection of the presenter may be used to modify the alpha values to emphasize more the speaker or emphasize more the shared digital rich media, depending on presenter gestures or motions. Activity detection and spatial analysis of the shared digital rich media may be used to classify the shared digital rich media as slide presentation or video and different compositing treatments could be used for each class of shared material.

The size of the shared digital rich media may be automatically adjusted based on content analysis of the spatial frequencies in the shared digital rich media frames. For example, small font size media may be enlarged for better visibility. In an embodiment, face detection may be used to composite face regions more carefully so that eyes and facial features are more visible. Depth-based cameras may be used to blend presenter information when gestures are near the screen, emphasizing the gestures instead of the full presenter video.

In an embodiment, the compositing operation may be overridden or be fully under interactive control of the presenter, the receiving audience, or a professional audiovisual technician. No system modification is needed to allow control by the presenter or a local audiovisual technician, but providing control to the receiving audience may involve modifying the system to transmit separately the two video streams and conduct the compositing at the receiving processor.

Figure 3:
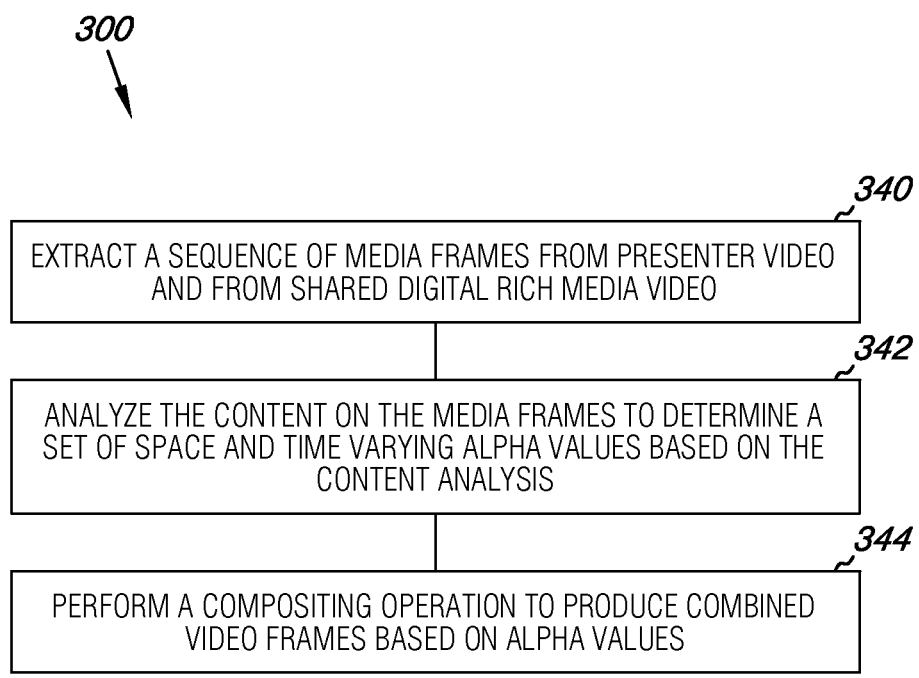
FIG. 3 is a flow chart illustrating a method for combining multiple video streams according to one or more embodiments of the present disclosure.

FIG. 3 is a flow chart illustrating a method 300 for combining multiple video streams according to one or more embodiments of the present disclosure. Embodiments of the present disclosure are not limited to the steps illustrated in FIG. 3. The method includes extracting media frames from presenter video and from shared digital rich media video at 340. Presenter media frames are captured by a camera, while digital rich media frames are sent digitally without camera-capture. The content of the frames is then analyzed in the method 300 to determine alpha values at 342. The content analysis includes computer vision and image analysis techniques, and alpha values are tailored to preserve the contrast of the presentation information and preserve lighter colors. The presenter media frames and the shared digital rich media frames are content-analyzed jointly. The method 300 further includes using the alpha values to perform a composition operation to produce combined video frames at 344. The compositing operation is performed using various Porter-Duff compositing rules.

Although specific embodiments have been illustrated and described herein, it will be appreciated that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the flowing claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
    capturing presenter video of a presenter, the presenter video temporally divided into a sequence of media frames, each media frame divided into spatial regions;
    by a processor:
        extracting the sequence from the video;
        analyzing the content on the media frames to determine a set of space and time varying alpha values, wherein the alpha values temporally vary in corresponding spatial regions over the sequence and spatially vary in each media frame over the spatial regions thereof,
        by assigning each region of each media frame a distinct alpha value equal to:
            a first value when the region includes presenter video background and a corresponding region of a corresponding media frame of shared digital rich media does not include text, or when the region does not includes a face or facial features of the presenter and the corresponding region includes the text;
            a second value less than the first value when the region includes the face or the facial features and the corresponding region does not include the text; or
            a third value less than the first value and greater than the second value when the region include the face or the facial features of the presenter and the corresponding includes the text;
        performing a compositing operation on the media frames in relation to corresponding media frames of the shared digital rich media to produce combined video frames based on alpha values of the regions of the media frames; and
        displaying a video of the combined video frames.

2. The method of claim 1, wherein the method includes tailoring the alpha values to preserve contrast associated with presentation information by analyzing colors of the shared digital rich media for slide presentations and preserving lighter colors.

3. The method of claim 1 wherein the method further includes determining local contrast as part of analyzing the content.

4. The method of claim 1 wherein the method further includes basing content analysis on local brightness analysis.

5. The method of claim 1 wherein the compositing operation is overridden and/or fully under interactive control of the receiving audience.

6. The method of claim 1 wherein the method includes performing the compositing operation using at least one Porter-Duff compositing rule.

7. The method of claim 6 wherein the method includes conducting at least one Porter-Duff compositing operation using alpha blending in an RGBA representation where A represents an alpha channel with space and time varying alpha values $\alpha(x, y, t)$ with x and y spatial pixel coordinates, and time t.

8. A computer-readable non-transitory medium storing a set of instructions executable by the computer to cause the computer to:
    receive presenter video of a presenter, the presenter video temporally divided into a sequence of media frames, each media frame divided into spatial regions;
    extract the sequence from the video;
    analyze the content on the media frames to determine a set of space and time varying alpha values, wherein the alpha values temporally vary in corresponding spatial regions over the sequence and spatially vary in each media frame over the spatial regions thereof, by assigning each region of each media frame a distinct alpha value equal to:
        a first value when the region includes presenter video background and a corresponding region of a corresponding media frame of shared digital rich media does not include text, or when the region does not includes a face or facial features of the presenter and the corresponding region includes the text;
a second value less than the first value when the region includes the face or the facial features and the corresponding region does not include the text; or
a third value less than the first value and greater than the second value when the region include the face or the facial features of the presenter and the corresponding includes the text;

perform a compositing operation on the media frames in relation to corresponding media frames of the shared digital rich media to produce combined video frames based on alpha values of the regions of the media frames; and display a video of the combined video frames.

9. The computer-readable medium of claim 8, further comprising computer-readable instructions executed to perform content analysis on the presenter media frames and shared digital rich media frames jointly.

10. The computer-readable medium of claim 8, further comprising computer-readable instructions executed to perform content analysis using local contrast determining steps and local brightness analysis.

11. The computer-readable medium of claim 8 wherein the Porter-Duff compositing operation is conducted using alpha blending in an RGBA representation where A represents an alpha channel with space and time varying alpha values $\alpha(x, y, t)$ with x and y spatial pixel coordinates, and time t.

12. The computer-readable medium of claim 8, further comprising computer-readable instructions for tailoring the alpha values to preserve the contrast of the presentation information by analyzing the shared digital rich media colors for slide presentations and preserving the lighter colors.

13. A presentation system comprising:
a processor and a memory coupled to the processor, wherein the memory includes stored executable instructions executed by the processor to:
receive presenter video of a presenter, the presenter video temporally divided into a sequence of media frames, each media frame divided into spatial regions;
extract a sequence of media frames from the video;
analyze the content on the media frames to determine a set of space and time varying alpha values, wherein the alpha values temporally vary in corresponding spatial regions over the sequence and spatially vary in each media frame over the spatial regions thereof, by assigning each region of each media frame a distinct alpha value equal to:
a first value when the region includes presenter video background and a corresponding region of a corresponding media frame of shared digital rich media does not include text, or when the region does not includes a face or facial features of the presenter and the corresponding region includes the text;
a second value less than the first value when the region includes the face or the facial features and the corresponding region does not include the text; or
a third value less than the first value and greater than the second value when the region include the face or the facial features of the presenter and the corresponding includes the text;
perform a compositing operation on the media frames in relation to corresponding media frames of the shared digital rich media to produce combined video frames based on alpha values of the regions of the media frames; and
cause a video of the combined video frames to be displayed.

14. The system of claim 13, wherein the system includes tailoring the alpha values to preserve contrast associated with presentation information by analyzing colors of the shared digital rich media for slide presentations and preserving lighter colors.

* * * * *